(12) United States Patent
Cowelchuk et al.

(10) Patent No.: US 7,090,284 B2
(45) Date of Patent: Aug. 15, 2006

(54) TRIM ASSEMBLY HAVING AN INTEGRATED GROMMET AND METHOD OF MAKING THE SAME

(75) Inventors: Glenn A Cowelchuk, Chesterfield Township, MI (US); Randy S Reed, Fair Haven, MI (US); Michael P Schoemann, Waterford, MI (US); John D Youngs, Southgate, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/710,655

(22) Filed: Jul. 27, 2004

(65) Prior Publication Data

US 2006/0022485 A1 Feb. 2, 2006

(51) Int. Cl.
*B60J 5/00* (2006.01)
*B62D 25/14* (2006.01)

(52) U.S. Cl. .................. 296/146.7; 296/70; 296/208

(58) Field of Classification Search ............ 296/146.1, 296/152, 146.7, 146.5, 70, 208; 49/501, 49/502
See application file for complete search history.

(56) References Cited

U.S. PATENT DOCUMENTS

| | | | | |
|---|---|---|---|---|
| 4,360,241 A * | 11/1982 | Fukunaga | .................... | 439/34 |
| 5,526,549 A | 6/1996 | Mori et al. | ....................... | 16/2 |
| 5,567,916 A * | 10/1996 | Napiorkowski et al. | | 174/153 G |
| 5,639,993 A | 6/1997 | Ideno et al. | ................. | 174/153 |
| 5,716,044 A * | 2/1998 | Peterson et al. | ............ | 296/152 |
| 5,836,048 A * | 11/1998 | Rossman et al. | ............. | 16/2.2 |
| 5,927,020 A * | 7/1999 | Kobrehel | ..................... | 49/502 |
| 5,981,877 A | 11/1999 | Sakata et al. | ............... | 174/153 |
| 6,064,003 A | 5/2000 | Moore et al. | ................. | 174/65 |
| 6,354,651 B1 * | 3/2002 | Mori | ....................... | 296/146.1 |
| 6,372,995 B1 | 4/2002 | Mochizuki et al. | ......... | 174/152 |
| 6,525,269 B1 | 2/2003 | Sato | ........................... | 174/65 |
| 6,536,835 B1 * | 3/2003 | Murakami et al. | .......... | 296/152 |
| 6,660,937 B1 | 12/2003 | MacLeod et al. | ............. | 174/65 |
| 6,895,634 B1 * | 5/2005 | Tisbo | ........................... | 16/2.1 |
| 6,953,897 B1 * | 10/2005 | Marroquin et al. | ....... | 174/75 C |
| 2002/0113460 A1 * | 8/2002 | Murakami et al. | ......... | 296/152 |
| 2003/0011209 A1 * | 1/2003 | Berta et al. | .............. | 296/146.7 |
| 2003/0015339 A1 | 1/2003 | Sato | ........................... | 174/65 |

* cited by examiner

*Primary Examiner*—Jason Morrow
(74) *Attorney, Agent, or Firm*—Wood, Herron & Evans, L.L.P.

(57) ABSTRACT

An interior trim assembly comprises a substrate member forming at least a part of the structural support of the trim assembly and having a front surface adapted to face the interior of the automobile and a back surface adapted to face opposite the front surface. The substrate member includes a connecting member integrally molded with the substrate member and having an aperture formed therethrough. A grommet is integrally molded in the aperture. Preferably, the substrate member has a hardness and the grommet has a hardness that is relatively lower than the hardness of the substrate member. A two-shot molding process may be used to make the trim assembly with the substrate member and connecting member being formed in the first shot and the grommet being formed in the second shot.

12 Claims, 5 Drawing Sheets

TRIM ASSEMBLY HAVING AN INTEGRATED GROMMET AND METHOD OF MAKING THE SAME

FIELD OF THE INVENTION

The present invention pertains generally to automotive interiors and more particularly to automotive grommets for securing a wire to a trim assembly.

BACKGROUND OF THE INVENTION

It is known to provide automotive interiors with various trim assemblies to improve the aesthetic appearance of the automotive interior and for the comfort and convenience of vehicle occupants. Examples of these interior trim assemblies include the instrument panels, armrests, door panels and consoles. In many of these trim assemblies, various instrumentation and other electronic components are mounted to the trim assembly for performing desired functions throughout the automobile. For instance, instrument panels have a wide variety of electrical components including lighting fixtures, audiovisual equipment and numerous switches that control the various systems of the automobile. Door panels likewise include electrical components such as speaker systems, window and door lock switches and other components.

To provide power to all these components and systems, the automotive electrical system includes a plurality of wires, many of which are part of wire harnesses, running throughout the automobile and along the various trim assemblies to the components mounted thereto. The wires are routed along the back side of the trim assembly so as to be hidden from view when the trim assembly is mounted to the automobile. If the wires are left unrestrained, the wires will often create a rattling or buzzing noise by contacting the back side of the trim assembly during normal operation of the vehicle or from the various vibrations in the automobile. These rattling noises are undesired and may lead to irritation of the vehicle's occupants.

As a result, automotive manufacturers have secured the wires running behind the various trim assemblies so as to prevent their movement relative to the trim assemblies. Conventional methods for manufacturing these trim assemblies include two-shot injection molding, wherein a first material is injected into a mold to form a rigid substrate of the trim assembly. A second, softer material is then injected into the mold to form a skin or cover over a front surface of the rigid substrate such that when the trim assembly is installed in the vehicle, the cover faces the automotive interior and provides a soft feel and an aesthetically pleasing appearance to the trim assembly. To secure the wires to the trim assembly, an assembly worker takes the as-formed trim assembly and generally forms a plurality of holes in the substrate at desired locations for securing the wires. The assembly worker will then insert attachment clips into the holes so that the attachment clips extend away from the back side of the substrate. The assembly worker will then couple the various wires running behind the trim assembly to the attachment clip. The attachment clip is generally made of a relatively rigid material which provides a structural aspect to the clip. Because the attachment clip is made from a relatively hard material, wires that are coupled thereto may still make undesired noises during normal operation of the automobile.

Moreover, current methods for securing wires to substrate members are manufacturing intensive, requiring multiple operations, multiple parts, and manual labor to produce the desired end product or result. The increased operations, parts, and manual labor contribute to increased manufacturing costs of the various trim assemblies. A need therefore exists for an automotive trim assembly that addresses these and other drawbacks of the prior art and prevents wires positioned behind the trim assembly from making undesired noises.

SUMMARY OF INVENTION

The present invention provides an automotive interior trim assembly and method of making the same that prevents the various wires running behind the trim assembly from making undesired noises. The trim assembly is made through a streamlined manufacturing process that reduces the number of parts and labor, thereby reducing the overall manufacturing costs of the trim assembly. The trim assembly may be formed as an instrument panel, interior door panel, console, or any other interior trim component that would benefit from preventing wires running behind the trim assembly from making undesired rattling or buzzing noises.

The interior trim assembly comprises a substrate member forming at least a part of the structural support of the trim assembly and having a front surface adapted to face the interior of the automobile and a back surface adapted to face opposite the front surface. The substrate member includes a connecting member integrally molded with the substrate member and further includes a hole or aperture formed through the connecting member. The connecting member is configured so as to extend away from the back surface of the substrate member where the various wires are routed. A wire or wire harness grommet is integrally molded in the aperture of the connecting member. The grommet is adapted to secure the wires to the connecting member so as to prevent movement of the wires with respect to the substrate member thereby providing a quieter vehicle compartment.

In one embodiment of the invention, the substrate member has a hardness and the grommet has a hardness that is relatively lower than the hardness of the substrate member. The substrate member and connecting member may be formed from thermoplastic olefin, acrylonitrile butadiene styrene, styrene maleic anhydride, or polycarbonate/acrylonitrile butadiene stryrene alloy. The grommet may be formed from a softer material, such as a thermoplastic elastomer. Moreover, the trim assembly may include a cover member disposed over the front surface of the substrate member to provide a soft feel and a more aesthetically pleasing appearance to the trim assembly. The cover member may be made from the same material as the grommet. The connecting member may completely encapsulate the aperture in which the grommet is formed. In an alternate embodiment, however, the aperture may include a slot portion extending to an edge of the connecting member to facilitate inserting a wire through the grommet. Additionally, the grommet generally includes a slit, and preferably a pair of slits oriented generally perpendicular to each other, extending at least partially across the grommet. The slits form a plurality of radially-extending fingers that secure the wires to the connecting member.

The trim assembly of the invention may be formed from a two-shot molding operation. A first curable material is injected into a mold during a first shot of the molding process to form the substrate member having the connecting member integrally formed therewith. An aperture is formed in the connecting member during the first shot. A second curable material is then injected into the mold during a second shot of the molding process to form the grommet in the aperture of the connecting member. The slits in the wire harness grommet may be formed as part of the molding operation. The cover member may also be formed on the front surface of the substrate member during the second shot.

The features and objectives of the present invention will become more readily apparent from the following Detailed Description taken in conjunction with the accompanying drawings.

BRIEF DESCRIPTION OF DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
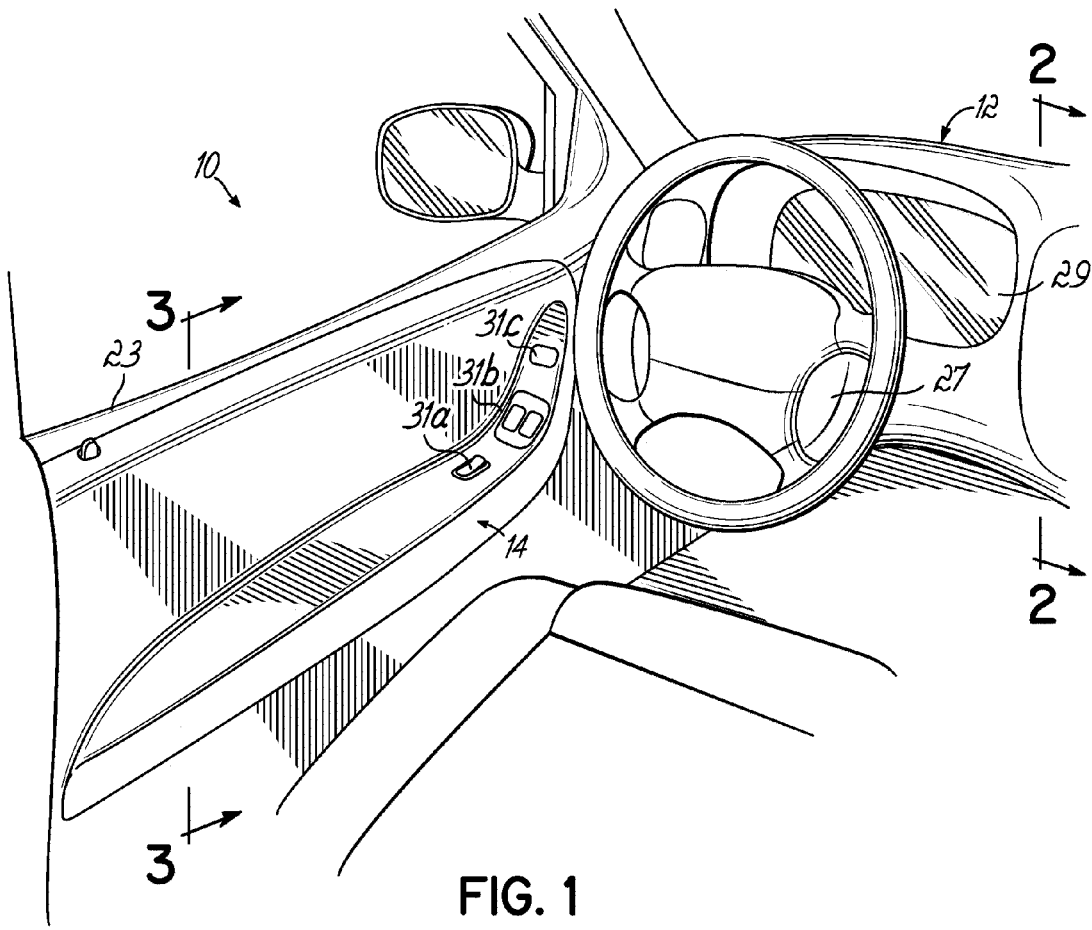
FIG. 1 is a perspective view of an automobile having exemplary automotive trim assemblies according to the invention.

Referring to FIG. 1, there is shown a typical automobile 10 including a number of exemplary trim assemblies according to the present invention, such as instrument panel 12 and door panel 14, that cover the interior of the automobile to provide a more aesthetically pleasing environment as well as additional comfort to the vehicle's occupants. The various trim assemblies, whether it be an instrument panel 12 or door panel 14, are generally constructed in a similar fashion. Thus, although the following detailed description will be directed toward an instrument panel 12 and door assembly 14, those having ordinary skill in the art will recognize that the invention may equally apply to other trim assemblies in the automobile 10.

Figure 2:
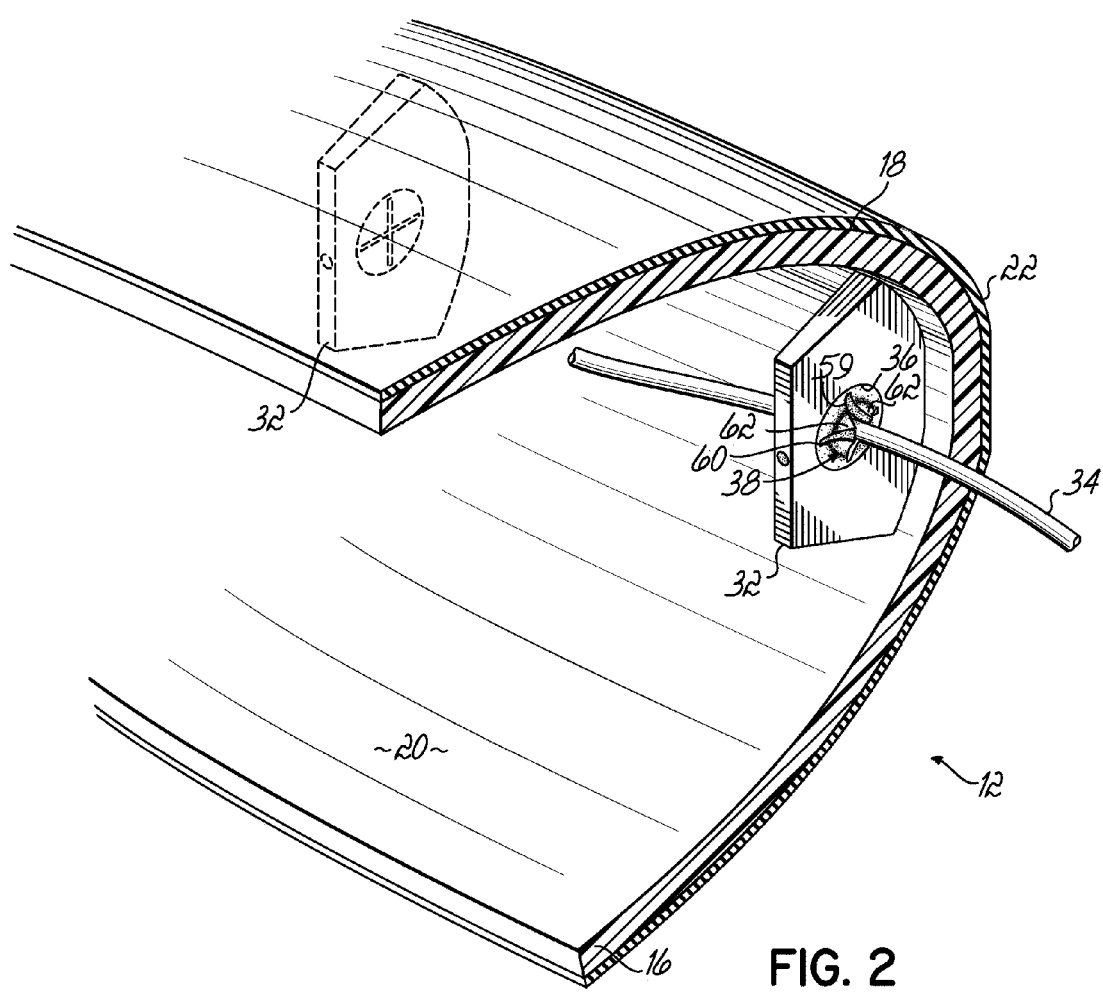
FIG. 2 is a perspective cross-sectional view of an exemplary instrument panel according to the invention.

As shown in FIGS. 1 and 2, instrument panel 12 is installed in a forward portion of the passenger compartment of the automobile 10. The instrument panel 12 includes a relatively rigid substrate member 16, which forms at least a portion of the structural support of the trim assembly and, defines the general shape of instrument panel 12. The substrate member 16 is then secured within the interior of the automobile 10, for example, by a bracket or mounting member (not shown) as is known in the art. Substrate member 16 includes a front surface 18 that faces the interior of the automobile 10 and a back surface 20 opposite the front surface 18 that is hidden from view when instrument panel 12 is mounted to the automobile 10. For economy cars, the front surface 18 of the rigid substrate member 16 may include a decorative design, such as for example a grained or textured style formed directly in the front surface 18. For more luxury-oriented cars, however, a pliable cover member 22 may be disposed over the front surface 18 of the substrate member 16 to provide an aesthetically pleasing appearance as well as provide a soft touch to instrument panel 12. Luxury cars may further include a foam layer (not shown) encased between the substrate member 16 and the pliable cover member 22 to further enhance the soft touch feel of the trim assembly. To provide the soft touch feel to instrument panel 12, the cover member 22 is generally made of a material having a hardness that is relatively lower than the hardness of substrate member 16.

Figure 3:
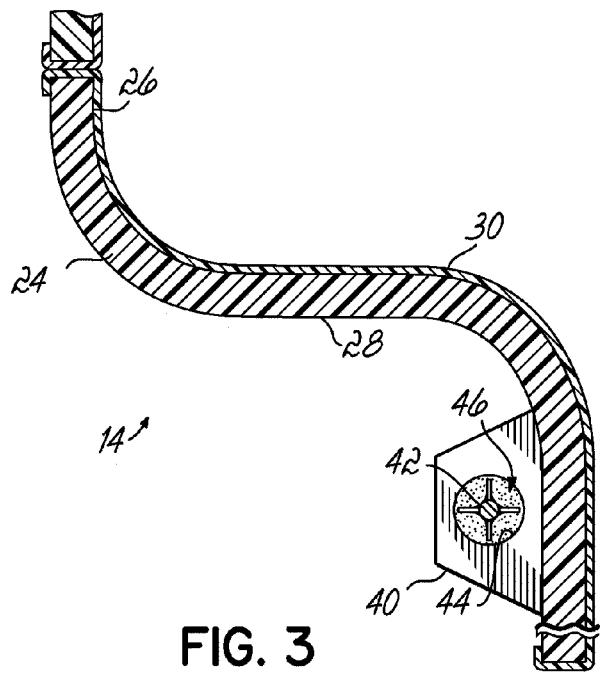
FIG. 3 is a cross-sectional view of an exemplary door panel according to the invention.

As shown in FIGS. 1 and 3, door panel 14 is installed on the interior side of the automobile door 23. As with instrument panel 12, door panel 14 includes a relatively rigid substrate member 24, which forms at least a portion of the structural support of the door panel 14 and defines the general shape of door panel 14. Door panel 14 includes a front surface 26 that faces the interior of the automobile 10 and a back surface 28 opposite the front surface 26 that is hidden from view when door panel 14 is mounted to the door 23 of automobile 10. The door panel 14 may also include a cover member 30 disposed over the front surface 26 to provide an aesthetically pleasing appearance as well as to provide a soft touch to the door panel 14. The cover member 30 is generally made of a material having a hardness that is relatively lower than the hardness of substrate member 24.

The trim assemblies in automobile 10 often have numerous wires or wire harnesses running along the back surface of the various trim assemblies so as to be hidden from view while allowing the wires to be routed to their appropriate locations. Instrument panel 12 includes several components mounted thereto that require wires be routed along the back surface 20 of instrument panel 12. For example, all the wiring for the steering column 27, including the ignition system, blinkers, windshield wipers, cruise control, etc. run behind the instrument panel 12. The wiring for the audio-visual systems, including display 29, as well as the climate control system also run behind the instrument panel 12. Moreover, wires leading to other areas of the automobile 10 may run behind instrument panel 12. For example, the wires for the electrical components in the doors 23 of the automobile 10 may run behind not only the instrument panel 12, but also run behind the door panels 14. These wires control, for example, the switches for door locks 31a, windows 31b, side mirrors 31c, etc. mounted in door panel 14.

As shown in FIG. 2, and in accordance with the invention, instrument panel 12 includes one or more connecting members 32 that are formed integral with the substrate member 16 for holding and securing the various wires 34 running along the back surface 20 of the instrument panel 12. The connecting members 32 extend away from the back surface 20 of instrument panel 12 and are typically made from the same material as substrate member 16. To hold and secure the various wires 34 to substrate member 16, connecting members 32 include an aperture 36 formed therethrough. A grommet 38 is integrally formed in aperture 36 in connecting member 32. Grommet 38 is generally formed from a material that has a hardness that is relatively lower than the hardness of the substrate member 16 to which it is coupled.

For instance, in one embodiment of the instrument panel 12, grommet 38 and the cover member 22 are formed from the same pliable material. The softer, more pliable grommet material provides a cushion surrounding the wires 34 going through the grommet 38 so as to prevent undesired rattling and other noises as a result of the various vibrations acting throughout the automobile 10. The connecting members 32 having grommets 38 incorporated therein are configured along instrument panel 12 so that the wires 34 do not contact the substrate member 16 between the connecting members 32. In this way, the various wires 34 running behind instrument panel 12 may be neatly and conveniently arranged to provide a quiet environment without any undesired rattling, buzzes and other vibration-induced noises that tend to irritate the vehicle's occupants as well as automobile manufactures and dealerships.

In further accordance with the invention and as shown in FIG. 3, door panel 14 includes one or more connecting members 40 that are formed integral with the substrate member 24 for holding and securing the various wires 42 running along the back surface 28 of door panel 14. The connecting members 40 extend away from the back surface 28 of door panel 14 and are generally made from the same material as substrate member 24. Connecting members 40 include an aperture 44 wherein a grommet 46 is integrally formed. Grommet 46 is generally formed from a material that has a hardness that is relatively lower than the hardness of the substrate member 24.

A method of making instrument panel 12 will now be described. Although the method will be described in reference to instrument panel 12, it should be recognized by one having ordinary skill in the art that the method herein described may also be used to make door panel 14 as well as other trim assemblies in automobile 10. In one embodiment, instrument panel 12 is formed by an injection molding operation. The substrate member 16 and connecting member 32 are formed from a first curable material such as thermoplastic olefin, acrylonitrile butadiene styrene, styrene maleic anhydride, polycarbonate/acrylonitrile butadiene styrene alloy, or other suitable materials for integrally molding the relatively rigid substrate member 16 and connecting member 32. The connecting member 32 is molded so as to have an aperture 36 therein. The grommet 38 is then injection molded into the aperture 36 and is formed from a second curable material, such as a thermoplastic elastomer, that is softer, or has a relatively lower hardness than the hardness of the material used to form the substrate member 16 and connecting member 32. A cover member 22 may be injection molded over the front surface 18 of the substrate member 16. The cover member 22 may be formed from the second curable material used to form the grommet 38 so as to provide a soft feel to the interior side of instrument panel 12. The invention is not so limited, however, and the cover material may be formed from a third curable material that provides a soft feel to the front surface 18 of the substrate member 16.

Figure 4A:
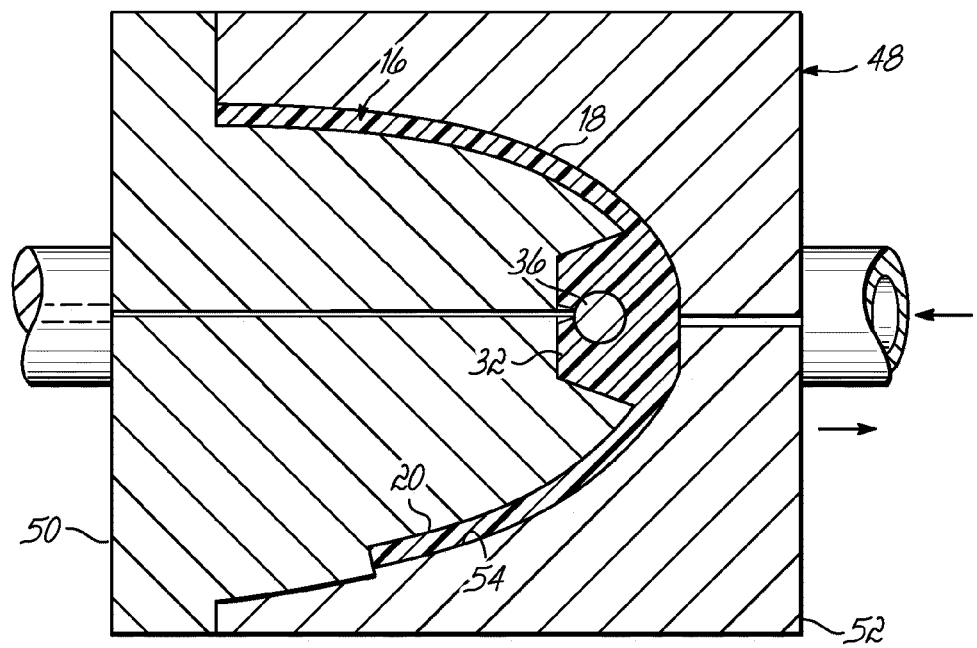
FIGS. 4A–4D sequentially illustrate a two-shot molding operation used to form the trim assemblies of the invention.
Figure 4B:
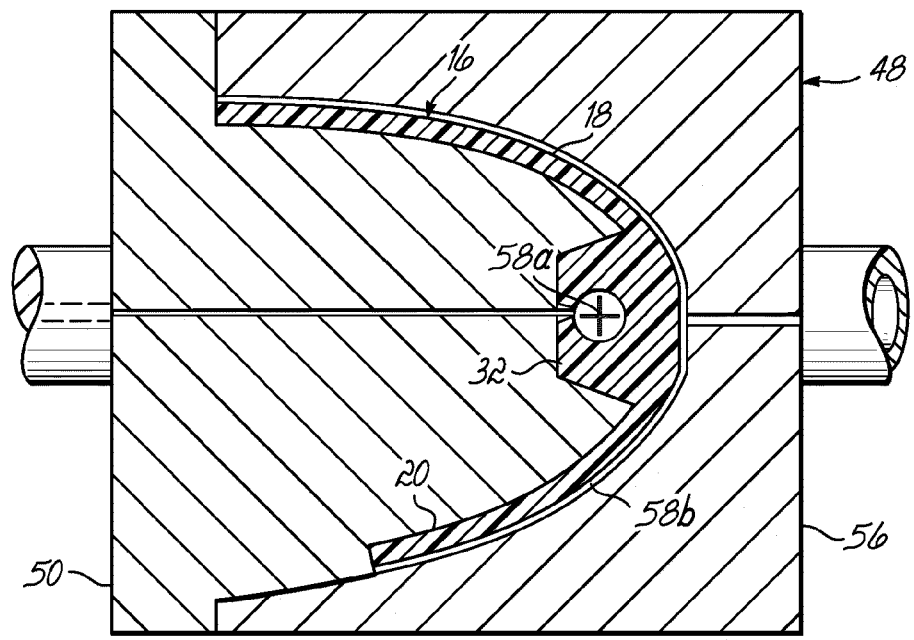
Figure 4C:
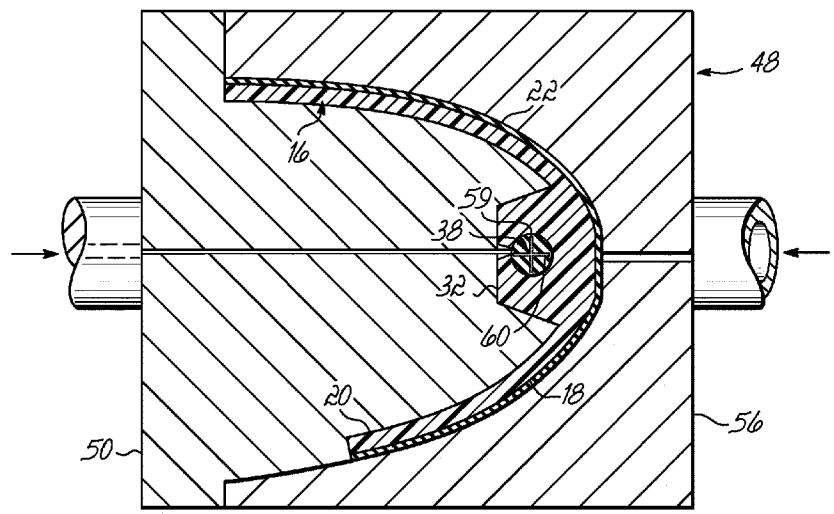
Figure 4D:
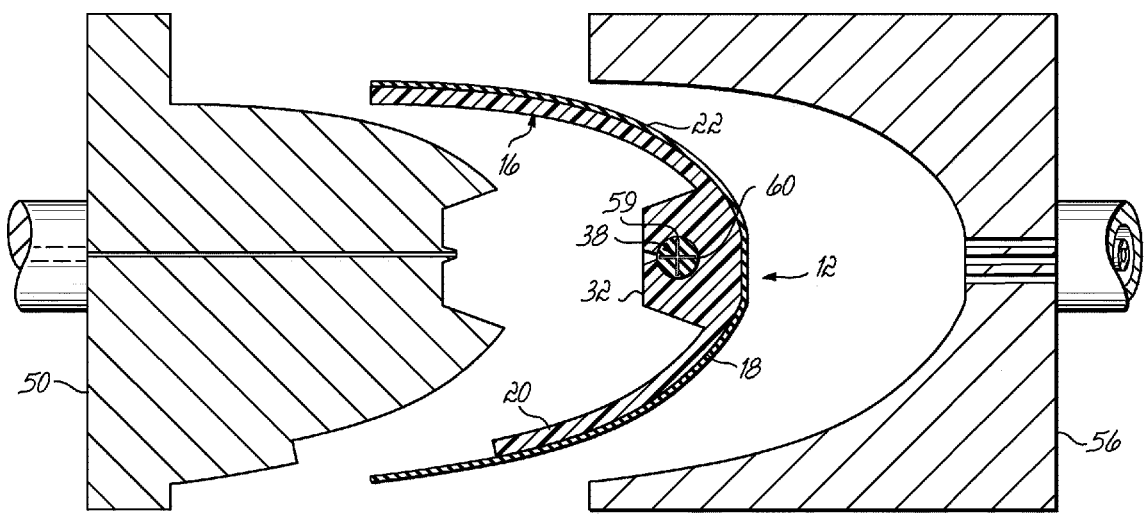

In another embodiment, the instrument panel 12 of the invention is formed in a two-shot molding operation, as will be discussed with reference to FIGS. 4A through 4D. As shown in FIG. 4A, the substrate member 16 and connecting member 32 of instrument panel 12 are formed during the first shot of the two-shot molding operation by injecting a first curable material into a mold 48 configured to integrally form the substrate member 16 and connecting member 32. The connecting member 32 is formed with an aperture 36 therein. To this end, the mold comprises first and second mold portions 50, 52 which may be assembled together to define an interior cavity 54 having the general shape of the substrate member 16 and connecting members 32. As shown in FIGS. 4B and 4C, after the first curable material is injected into the mold 48 to form the substrate member 16 and connecting members 32, the second mold portion 52 is removed and replaced with a third mold portion 56 which is configured such that the first and third mold portions 50, 56 define another cavity 58a for forming the grommet 38 during the second shot of the two-shot mold operation. A cavity 58b formed from first and third mold portions 50, 56 may also be provided for forming cover member 22 over at least a portion of the front surface 18 of the substrate member 16. As shown in FIG. 4D, the finished instrument panel 12 is thereafter removed from the mold 48 where it is subsequently installed into automobile 10.

The first curable material may have a hardness that is different from the hardness of the second curable material. Preferably, the second curable material has a hardness that is relatively lower than the hardness of the first curable material. For example, the first curable material injected into the mold may be thermoplastic olefin, acrylonitrile butadiene styrene, styrene maleic anhydride, polycarbonate/acrylonitrile butadiene styrene alloy, or other suitable materials. The second curable material injected into the mold may be a thermoplastic elastomer.

The grommets 38 may have at least one, and preferably two slits therethrough to permit wires 34 to pass through, thereby securing the wires 34 to the connecting members 32. As shown in FIGS. 2, 4C, and 4D, the grommets 38 may include a first slit 59 through the grommet 38 that extends at least partially across the aperture 36 in which the grommet 38 is integrally formed. Preferably, the grommet 38 may also include a second slit 60 through the grommet 38 and extending at least partially across the aperture 36 in which the grommet is integrally formed. The second slit 60 is preferably formed so as to be substantially perpendicular to the first slit 59 thereby forming a plurality of radially-extending fingers 62. As shown in FIG. 2, the fingers 62 flex when a wire 34 is inserted through the grommet 38 thereby securing the wire 34 to the connecting member 32 while providing a soft cushion of material surrounding the wire 34. As shown in FIG. 4C, the first and second slits 59, 60 may be formed in the grommet 38 during the two-shot molding process. In particular, the first and third molding portions 50, 56 may be so configured to provide the slits 59, 60 in the grommet 38 during the second shot of the molding operation such that when the instrument panel 12 is removed from mold 48, the slits 59, 60 are already formed in the grommet 38.

Figure 5:
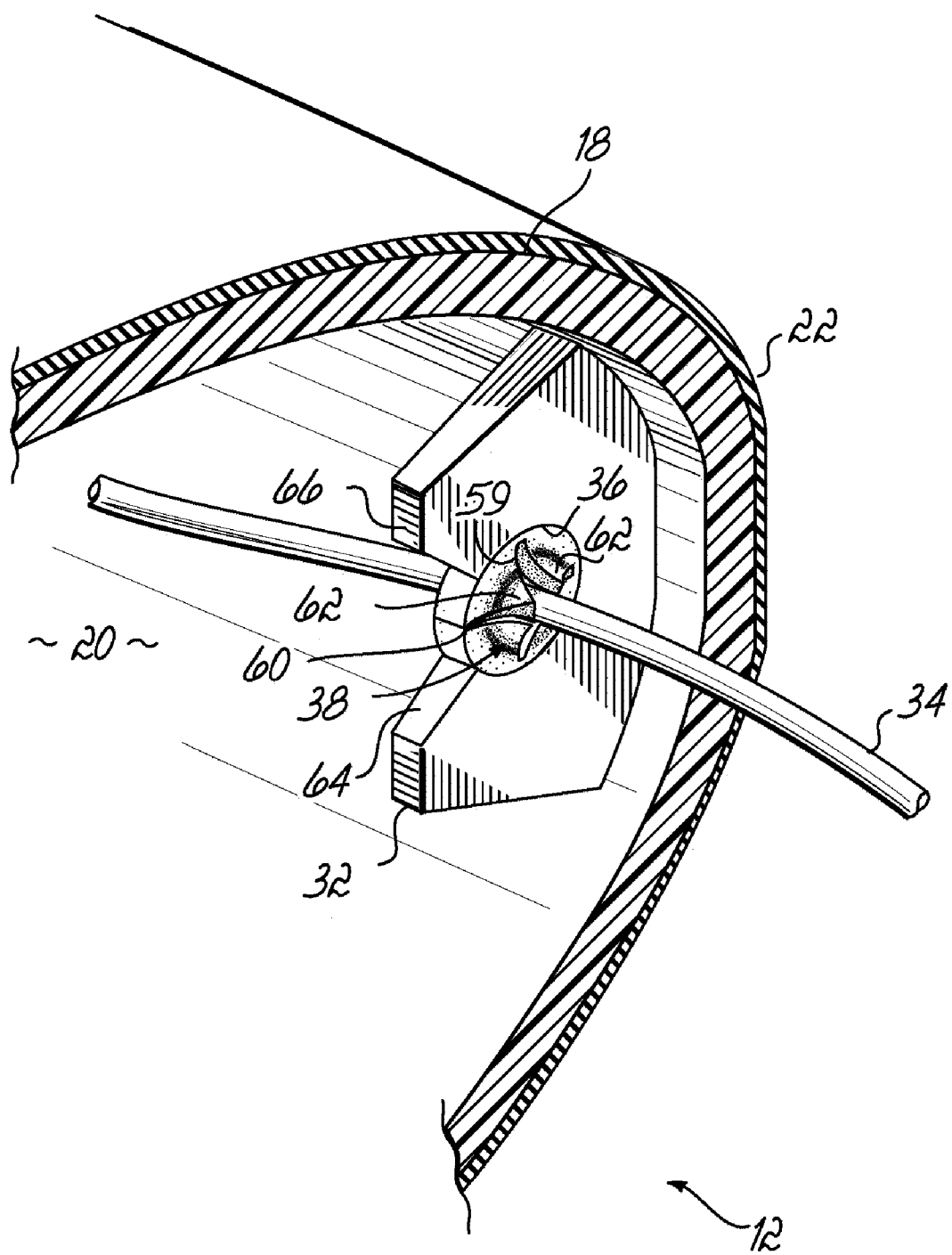
FIG. 5 is an enlarged perspective view of an alternate embodiment of the connecting member of FIG. 2.

As shown in FIG. 2 for instrument panel 12, connecting member 32 may completely encapsulate grommet 38. To insert a wire 34 through grommet 38, an assembly worker would move the wire 34 in a direction substantially perpendicular to the plane of the grommet 38 to, in essence, thread wire 34 through grommet 38. In an alternate embodiment of connecting member 32, and as shown in FIG. 5, aperture 36 may include a slot portion 64 that is open to aperture 36 and extends to an edge 66 of connecting member 32. In this way, instead of threading wire 34 through grommet 38, wire 34 may be inserted into grommet 38 by moving wire 34 along the plane of grommet 38 through slot portion 64. Moreover, in this embodiment, at least the end of slit 60 adjacent slot portion 64 extends to the periphery of grommet 38 so that wire 34 may be inserted therein. Those of ordinary skill in the art will recognize that the alternate embodiment of connecting member 32 shown in FIG. 5 may be used with door assembly 14 and other interior trim assemblies. Moreover, those of ordinary skill in the art will further recognize that the method of making a trim assembly having the connecting member 32 shown in FIG. 5 is the same as disclosed herein, but that the mold portions 50, 52 are configured to form slot portion 64 in connecting member 32.

While the interior trim assembly has been shown and described herein as an instrument panel 12 and door panel 14, it will be recognized that the interior trim assembly of the invention may alternatively be formed to create other trim assemblies, such as consoles and other interior trim assemblies.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. An automotive interior trim assembly for coupling to an automobile, comprising:
   a substrate member forming at least a part of a structural support of the trim assembly, said substrate member having a front surface adapted to face the interior of the automobile and a back surface adapted to face opposite said front surface;
   a connecting member integrally molded with said substrate member and extending away from said back surface, said connecting member having an aperture formed therein; and
   a grommet integrally molded in said aperture and adapted to secure a wire to said connecting member so as to prevent movement of the wire with respect to said substrate member.

2. The trim assembly of claim 1, wherein said substrate member has a hardness and said grommet has a hardness that is relatively lower than the hardness of said substrate member.

3. The trim assembly of claim 1 further comprising:
   a cover member overlying at least a portion of said front surface and adapted to provide a soft feel to the trim assembly, said cover member having a hardness that is relatively lower than a hardness of said substrate member.

4. The trim assembly of claim 1, wherein said substrate member is formed from a material selected from the group consisting of thermoplastic olefin, acrylonitrile butadiene styrene, styrene maleic anhydride, and polycarbonate/acrylonitrile butadiene styrene alloy.

5. The trim assembly of claim 4, wherein said grommet is formed from a thermoplastic elastomer.

6. The trim assembly of claim 1, wherein said grommet is formed from a thermoplastic elastomer.

7. The trim assembly of claim 1, wherein said connecting member completely encapsulates said aperture.

8. The trim assembly of claim 1, wherein said aperture includes a slot portion extending to an edge of said connecting member, the wire insertable in said grommet through said slot portion.

9. The trim assembly of claim 8, wherein said grommet includes a first slit therethrough and extending across said grommet so as to intersect a periphery of said grommet, said slit adapted to secure the wire to said connecting member when the wire is inserted through said slit.

10. The trim assembly of claim 9, wherein said grommet includes a second slit therethrough and extending at least partially across said grommet, said second slit being substantially perpendicular to said first slit to form a plurality of radial fingers, said first and second slits adapted to secure the wire to said connecting member when the wire is inserted through said first and second slits.

11. The trim assembly of claim 1 configured as an instrument panel for an automobile.

12. The trim assembly of claim 1 configured as a door panel for an automobile.

* * * * *